Oct. 17, 1950     O. E. ALLEN ET AL     2,526,186
WORM GEAR PLOW LIFTING DEVICE

Filed Dec. 23, 1948     2 Sheets-Sheet 1

INVENTORS
OLIN E. ALLEN,
KENNETH E. ALLEN,
BY
McMorrow, Berman + Davidson
ATTORNEYS.

Oct. 17, 1950     O. E. ALLEN ET AL     2,526,186
WORM GEAR PLOW LIFTING DEVICE
Filed Dec. 23, 1948     2 Sheets-Sheet 2
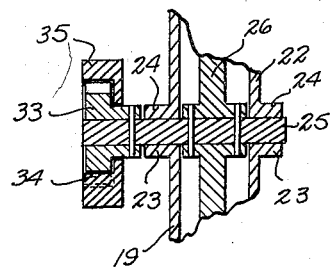
FIG. 5.
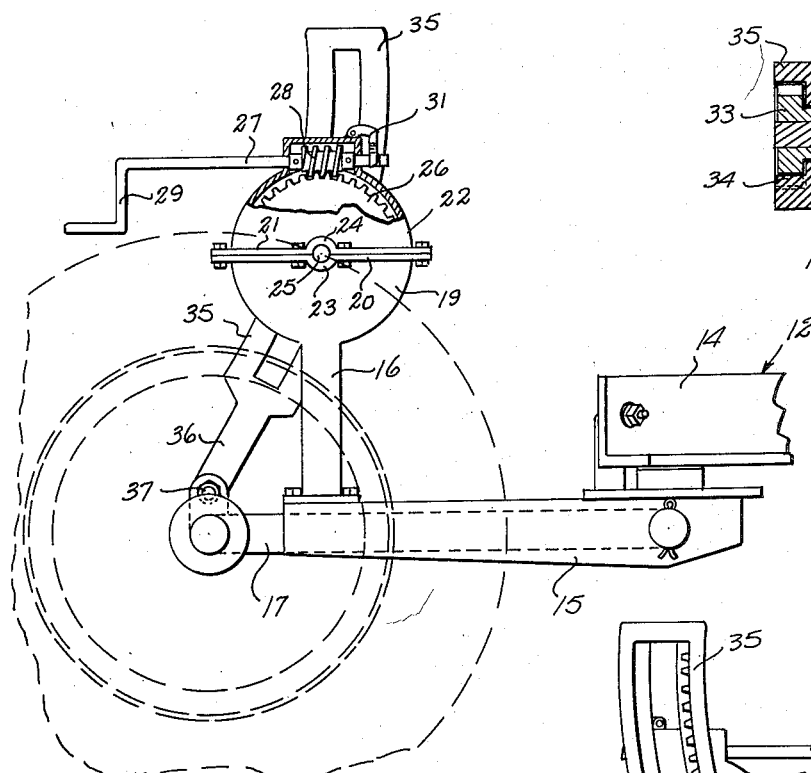
FIG. 3.
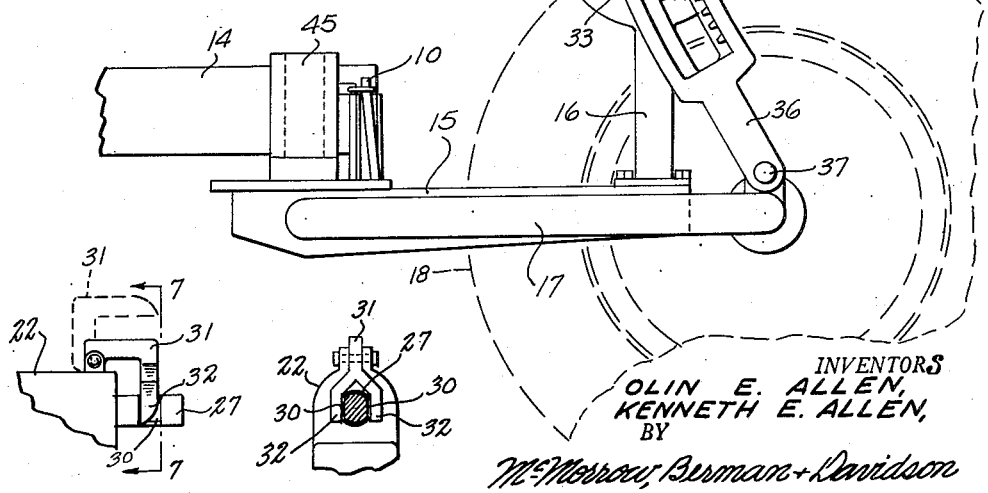
FIG. 4.
FIG. 6.     FIG. 7.
INVENTORS
OLIN E. ALLEN,
KENNETH E. ALLEN,
BY
McMorrow, Berman + Davidson
ATTORNEYS.

Patented Oct. 17, 1950

2,526,186

UNITED STATES PATENT OFFICE 2,526,186

WORM GEAR PLOW LIFTING DEVICE

Olin E. Allen and Kenneth E. Allen, Turpin, Okla.

Application December 23, 1948, Serial No. 66,882

2 Claims. (Cl. 280—44)

This invention relates to tractor drawn disc plows, and more particularly to means for lifting tractor-drawn disc plows out of engagement with the soil.

A main object of the invention is to provide a novel and improved mechanism for lifting plows out of engagement with the soil, said mechanism being intended to replace the conventional lever arrangements now employed which have proven to be very unsatisfactory in view of the great weight of the plows, especially when loaded with blocks or other weighting means, the improved mechanism being very simple in construction, easy to operate, and enabling the plows to be lifted from the ground by a single operator and without requiring the use of a jack or other auxiliary lifting device.

A further object of the invention is to provide an improved lifting mechanism for tractor drawn multiple-disc plow assemblies, said mechanism being relatively inexpensive to fabricate, sturdy in construction and enabling the plows to be lifted by the application of relatively small force to the operating handle of the mechanism, whereby the plows may be readily lifted by a single operator without requiring the weighting blocks to be removed from the plow beam.

Further objects and advantages of the invention will become apparent from the following description and claims, and from the accompanying drawings, wherein:

Figure 3 is an enlarged side elevational detail view, partly in cross-section, taken on line 3—3 of Figure 1, with the caster wheel shown in dotted view.

Figure 4 is an enlarged elevational detail view taken on line 4—4 of Figure 1.

Figure 5 is an enlarged cross-sectional detail view taken on line 5—5 of Figure 4.

Figure 6 is an enlarged elevational detail view of the locking means for the crank handle employed in the lifting mechanism of Figures 1 to 5.

Figure 7 is a cross-sectional detail view taken on line 7—7 of Figure 6.

Figure 1:
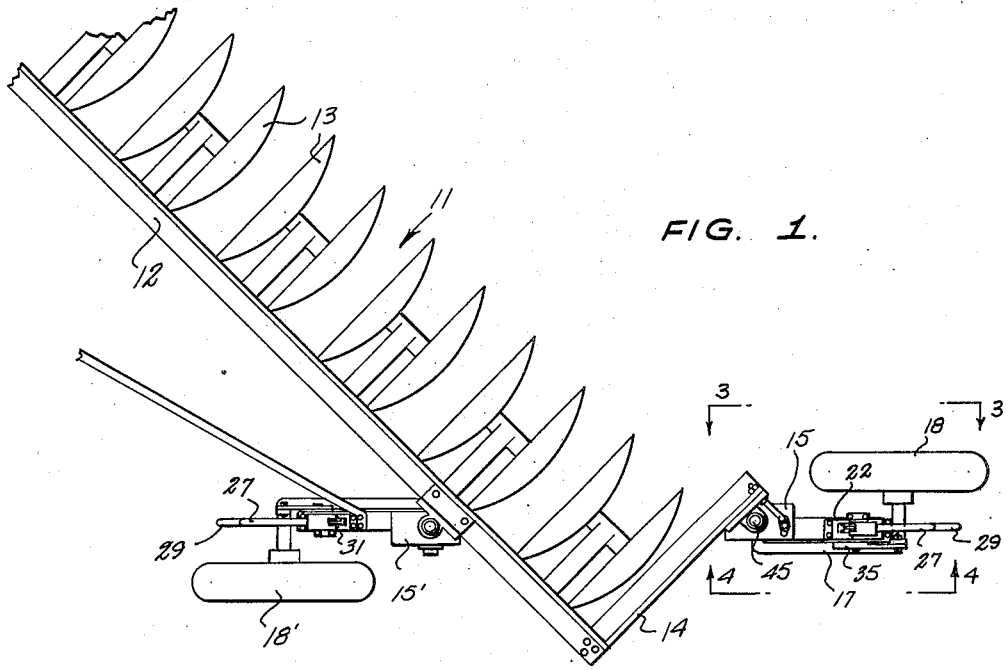
Figure 1 is a fragmentary top plan view of a multiple-disc plow assembly provided at its supporting casters with plow lifting mechanisms constructed in accordance with the present invention.
Figure 2:
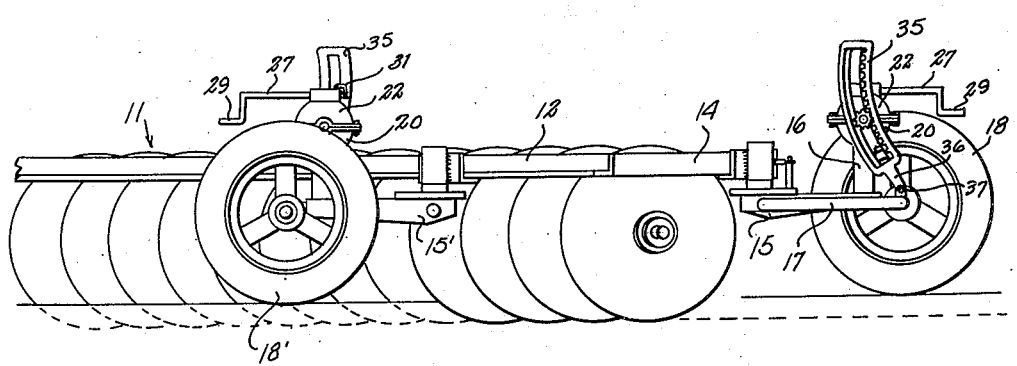
Figure 2 is a side elevational view of the portion of the disc plow assembly shown in Figure 1.

Referring to the drawings, 11 designates a conventional multiple-disc plow assembly adapted to be drawn by a tractor or the like. Said assembly comprises a frame 12 on which are mounted the plow discs 13. Frame 12 includes an end bar 14. Pivoted at 45 to the end of bar 14 for rotation in a horizontal plane is a rearwardly extending supporting bracket 15 carrying at its rear end a vertical standard 16. Pivoted to bracket 15 for rotation in a vertical plane is a rearwardly extending caster arm 17, to the end of which is journalled the ground-engaging wheel 18.

The top of standard 16 is formed with a hollow semi-circular housing segment 19 having a top flange 20. Bolted to flange 20 is the flange 21 of a downwardly facing semi-circular housing segment 22. The flanges 20 and 21 are formed at opposite sides with bearing portions 23 and 24, and journalled transversely in the bearing portions is a shaft 25 carrying a worm gear 26. Journalled longitudinally in the top of housing segment 22 is a shaft 27 carrying a worm 28 which meshes with worm gear 26. One end of shaft 27 is formed with a crank handle 29. The other end of shaft 27 is notched on opposite sides thereof adjacent the wall of housing segment 22, as shown at 30, 30. Pivoted to the top of segment 22 is a C-shaped arm 31 having spaced fingers 32, 32, engageable in the notches 30, 30, as shown in Figures 6 and 7, to lock the shaft 27.

Shaft 25 extends outwardly at one side of the worm gear housing and carries a pinion gear 33. Gear 33 meshes with rack teeth 34 formed within a slotted arcuate rack bar 35. Rack bar 35 is formed with a depending arm 36 which is pivotally connected to the rear end portion of caster bar 17 at 37. It will be seen that when shaft 27 is rotated, worm 28 rotates worm gear 26 and pinion gear 33. Said pinion gear transmits force to the rack bar 35 at the rack teeth 34. A downward force on said rack bar causes the caster arm 17 to be rotated downwardly relative to bracket 15. Since wheel 18 is supported on the ground, the effect is to raise bracket 15, thereby elevating the plow frame.

A similar mechanism is employed at the forward bracket, shown at 15', for elevating said forward bracket with respect to the forward ground-engaging wheel, shown at 18'.

The shafts 27 of the lifting mechanisms may be locked by means of the pivoted locking arms 31, as shown in full line view in Figure 6. To release either of the shafts 27 for rotation, the associated locking arm 31 is lifted to the dotted line position of Figure 6. It is therefore apparent that the plow assembly may be elevated to any desired position and held by engaging the fingers 32, 32 of the locking arms 31 with the notches 30, 30 of the respective lifting shafts 27.

While a specific embodiment of a plow lifting mechanism has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. Wheel adjustment mechanism for a farm implement including a substantially horizontal bar, said mechanism comprising an elongated substantially horizontal bracket pivotally mounted upon the horizontal bar for horizontal swinging movement, an upstanding substantially vertical standard secured to the outer end of the bracket and projecting above the same for a substantial distance, an auxiliary thin substantially semi-circular lower housing section secured to the top of the standard, a companion axially thin upper housing section mounted upon the lower housing section and forming therewith an axially thin substantially circular housing, a worm gear rotatably mounted within the housing and including a shaft projecting axially outwardly beyond one side of the housing, a pinion gear mounted upon the shaft outwardly of the housing, an elongated rack bar having a slot provided with gear teeth operatively connected with the pinion gear and arranged generally vertically, a substantially horizontal elongated longitudinally extending arm pivotally connected with the horizontal bracket near the forward end of the bracket and extending longitudinally of the bracket and beyond the rear end thereof, the arm being adapted to swing vertically with respect to the bracket and having its rear end pivotally connected with the bottom of the rack bar, the arm including a rear transverse extension upon which the wheel is rotatably mounted, and means to turn the worm gear.

2. Wheel adjustment mechanism for implements including a substantially horizontal frame member, said mechanism comprising an elongated substantially horizontal bar pivotally mounted upon the frame member for horizontal swinging movement with respect to the frame member, an upstanding standard mounted upon the bar near its free end, a lower axially narrow housing section secured to the top of the standard, a companion axially narrow upper housing section mounted upon the lower housing section and forming therewith an axially narrow vertically disposed housing arranged substantially in vertical alignment with the bar, a horizontal transverse shaft rotatably mounted upon the housing and projecting outwardly beyond one side thereof, a worm gear mounted upon the shaft and arranged within the housing, a worm mounted within the housing for rotation and arranged in mesh with the worm gear, the worm having its axis of rotation extending longitudinally of the bar and substantially at right angles to the shaft, a crank connected with the worm gear to turn it, a pinion gear mounted upon the shaft outwardly of the housing and adjacent to one side thereof, an arm extending longitudinally of the bar adjacent to one side of the bar and pivotally connected with the bar near the forward end thereof for vertical swinging movement, a generally vertical rack bar arranged adjacent to the rear end of the bar and having its bottom end pivotally connected to the arm near the rear end of the arm, the rack bar having a longitudinal arcuate slot provided with gear teeth, the slot receiving the pinion gear for meshing engagement with the gear teeth of the slot, and a transverse extension secured to the rear end of the arm for rotatably receiving the wheel.

OLIN E. ALLEN.
KENNETH E. ALLEN.

REFERENCES CITED

The following references are of record in the file of this patent:

UNITED STATES PATENTS

| Number | Name | Date |
| --- | --- | --- |
| 531,167 | Drovedal | Dec. 18, 1894 |
| 625,764 | Heylman | May 30, 1899 |